US009418489B2

(12) United States Patent
Macdonald et al.

(10) Patent No.: US 9,418,489 B2
(45) Date of Patent: Aug. 16, 2016

(54) PROVIDING CELLULAR DATA TO A VEHICLE OVER DIFFERENT DATA CHANNELS

(71) Applicant: General Motors LLC, Detroit, MI (US)

(72) Inventors: Andrew J. Macdonald, Grosse Pointe Park, MI (US); Jonathan L. Gerlach, Canton, MI (US); Dipankar Pal, Sylvania, OH (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/674,735

(22) Filed: Mar. 31, 2015

(65) Prior Publication Data

US 2015/0222553 A1 Aug. 6, 2015

Related U.S. Application Data

(63) Continuation-in-part of application No. 14/172,200, filed on Feb. 4, 2014.

(51) Int. Cl.
*G07C 5/00* (2006.01)
*H04W 4/00* (2009.01)
*H04W 4/04* (2009.01)

(52) U.S. Cl.
CPC ............. *G07C 5/008* (2013.01); *H04W 4/00* (2013.01); *H04W 4/046* (2013.01)

(58) Field of Classification Search
CPC .... H04L 47/2475; H04L 47/22; G07C 5/008; H04W 28/0215
See application file for complete search history.

(56) References Cited

U.S. PATENT DOCUMENTS

| 2006/0068845 | A1* | 3/2006 | Muller et al. ................. 455/558 |
| 2011/0118934 | A1* | 5/2011 | Lowrey et al. .................. 701/33 |
| 2012/0089684 | A1* | 4/2012 | Angus ..................... H04L 47/22 709/206 |
| 2012/0158820 | A1* | 6/2012 | Bai et al. ....................... 709/202 |

* cited by examiner

*Primary Examiner* — Curtis A Alia
(74) *Attorney, Agent, or Firm* — Christopher DeVries; Reising Ethington P.C.

(57) ABSTRACT

A method and a system for providing vehicle data services to communication devices located at a remote vehicle. The method includes the steps of: establishing data communication between a telematics backend system and one of a plurality of communication devices located at the remote vehicle; determining at the telematics backend system an access point name (APN) for at least one of the plurality of communication devices, a type of vehicle services data for the at least one of the plurality of communication devices, or both; and based on the determined APN, the type of vehicle services data, or both, transmitting from or receiving at the telematics backend the vehicle services data according to a network traffic shaping scheme.

19 Claims, 5 Drawing Sheets

| Vehicle-Backend Private Data |||||
|---|---|---|---|---|
| | Usage Characteristics | Transmission Characteristics || Billing Characteristics |
| Safety-Related Data | Low usage | Low peak data rate || Insensitive to cost |
| | | Relatively insensitive to latency || |
| | | Sensitive to infrastructure footprint || |
| | | Priority desirable when network busy || |
| | | Sensitive to security issues || |
| GPS Augment Data | High usage | Low peak data rate || Sensitive to cost per Mb |
| | | Relatively insensitive to latency || |
| | | Sensitive to infrastructure footprint || |
| | | Priority desirable when network busy || |
| | | Sensitive to security issues || |
| Vehicle Diagnostic Data | Infrequent uploads | Insensitive to latency || Sensitive to cost per Mb |
| | | Minimal infrastructure needed || |
| | | Priority not needed when network busy; less sensitive to reliability || |
| Traffic Probe Data | Low usage, small packet data | Insensitive to reliability || Insensitive to cost |
| | | Insensitive to latency || |
| | | Minimal infrastructure needed || |
| | | Sensitive to packet transmission efficiency || |

*Figure 2*

| Vehicle Wi-Fi Hotspot Data | | | |
|---|---|---|---|
| | Usage Characteristics | Transmission Characteristics | Billing Characteristics |
| MTD or Mobile Device Data | High usage, per device | High peak data rate(s) | Sensitive to cost per Mb (or per Gb) |
| | | Highly sensitive to latency | |
| | | Data rate variations during peak data transmission periods is permissible | |
| | | Some sensitivity to quality or type of wireless network coverage (e.g., LTE or other) | |

*Figure 3*

| Head-Unit Application Data | | | |
|---|---|---|---|
| | Usage Characteristics | Transmission Characteristics | Billing Characteristics |
| MTD Data | High usage | High peak data rate(s) | Sensitive to cost per Mb (or per Gb) |
| | | Sensitive to latency | |
| | | Data rate variations during peak data transmission periods is permissible | |
| | | Sensitive to security issues | |

*Figure 4*

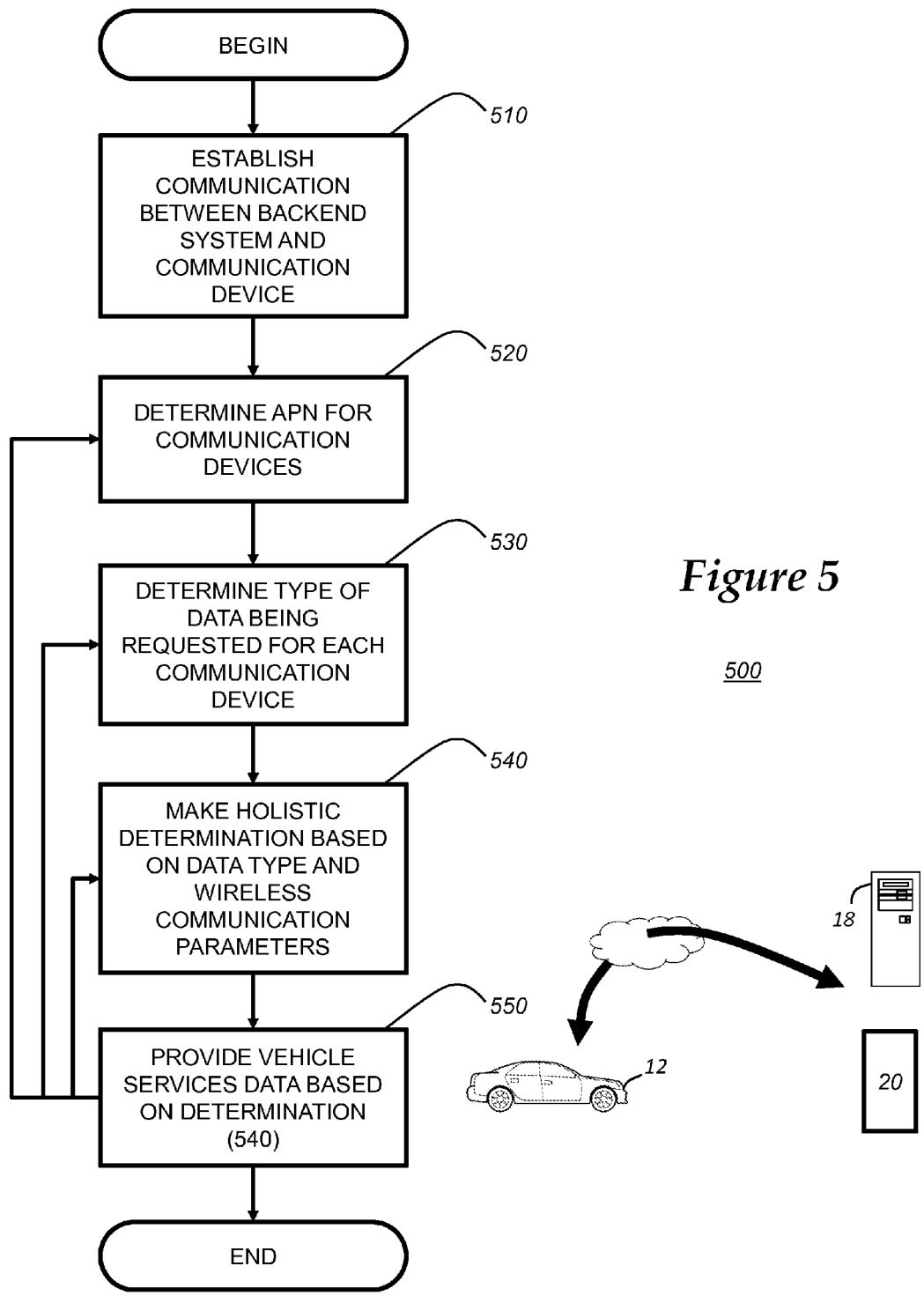

US 9,418,489 B2

PROVIDING CELLULAR DATA TO A VEHICLE OVER DIFFERENT DATA CHANNELS

This application is a continuation-in-part of U.S. patent application Ser. No. 14/172,200 filed on Feb. 4, 2014.

TECHNICAL FIELD

The present invention relates to providing wireless data services to a vehicle, and more particularly, to providing the wireless data services to communication devices located at the vehicle.

BACKGROUND

Vehicle occupants are increasingly desiring greater access to entertainment data and applications while in their vehicles. Vehicles are capable of storing some of this data or applications within the system storage. At other times, it may be desirable to acquire this entertainment data from a remote services or from the cloud.

Occasionally, different data may be desired for different applications simultaneously. For example, satellite Radio may be streaming while a GPS or navigational data download also is desired. At times, the amount of simultaneously desired data that requires a quality of service to be maintained to drive all the applications' needs.

SUMMARY

According to an embodiment of the invention, there is provided a method of providing vehicle data services to communication devices located at a remote vehicle. The method includes the steps of: establishing data communication between a telematics backend system and one of a plurality of communication devices located at the remote vehicle; determining at the telematics backend system an access point name (APN) for at least one of the plurality of communication devices, a type of vehicle services data for the at least one of the plurality of communication devices, or both; and based on the determined APN, the type of vehicle services data, or both, transmitting from or receiving at the telematics backend the vehicle services data according to a network traffic shaping scheme.

According to another embodiment of the invention, there is provided a method of providing vehicle data services to communication devices located at a remote vehicle. The method includes the steps of: establishing data communication between a telematics backend system and two communication devices located at the remote vehicle; determining at the telematics backend system an access point name (APN) for each of the two communication devices; determining at the telematics backend a type of data being requested by the two communication devices, the types including: backend private data, hotspot data, and head-unit data; holistically determining a dynamic traffic shaping scheme at least partially based on the APNs and the data types; and providing vehicle data services to the two communication devices based on the holistic determination.

BRIEF DESCRIPTION OF THE DRAWINGS

One or more embodiments of the invention will hereinafter be described in conjunction with the appended drawings, wherein like designations denote like elements, and wherein:

FIG. 2 is a table illustrating one embodiment of vehicle-backend private data;

FIG. 3 is a table illustrating one embodiment of vehicle Wi-Fi hotspot data;

FIG. 4 is a table illustrating one embodiment of vehicle head-unit application data;

FIG. 5 is a flow diagram illustrating one method of traffic shaping utilizing the communications system shown in FIG. 1.

DETAILED DESCRIPTION OF THE ILLUSTRATED EMBODIMENT(S)

The system described below includes a vehicle having a telematics unit and one or more communication devices in or within the vicinity of the vehicle. The communication devices may be mobile devices or integrated modules within the vehicle. The telematics unit is capable of acquiring data from a cloud server or a call center and then providing or conveying this data to the communication devices, rather than the communication devices receiving this data directly therefrom. In some implementations, the data is provided wirelessly to the communication devices from the telematics unit, It is desirable in some instances to categorize the data being provided by various communication devices. This may be accomplished by receiving and using a unique identifier from each communication device. This may enable the telematics unit to prioritize which communication device should continue to receive data if the through-put or wireless bandwidth is limited. For example, it may be desirable to grant a high priority to a communication device such as an integrated vehicle head unit. Thus, when bandwidth is limited, data to other communication devices in the vehicle is either terminated (at least temporarily) or the quality of service (QoS) is degraded but data to the head unit remains the highest available QoS. Also, the data category or type received by certain communication devices may be associated with a predetermined QoS. For example, the head unit may receive the highest QoS, while the QoS for other devices may be lower. The data category may be used for billing purposes as well. For example, the vehicle head unit may be billable at one rate and a communication device such as a Smart phone may be billable at another rate.

According to some embodiments described herein, where several communication devices associated with the vehicle are receiving data simultaneously (or nearly so), the server or call center may provide vehicle service data by generating a dynamic traffic shaping scheme or configuration based on identification of the device (e.g., using an access point name or APN), the type of data being provided (or requested) by the device, and various wireless communication parameters (which have associated usage, transmission, and billing characteristics).

This system and the various methods carried out by the system are described below in greater detail. In addition, the operating environment is described below.

Communications System—

Figure 1:
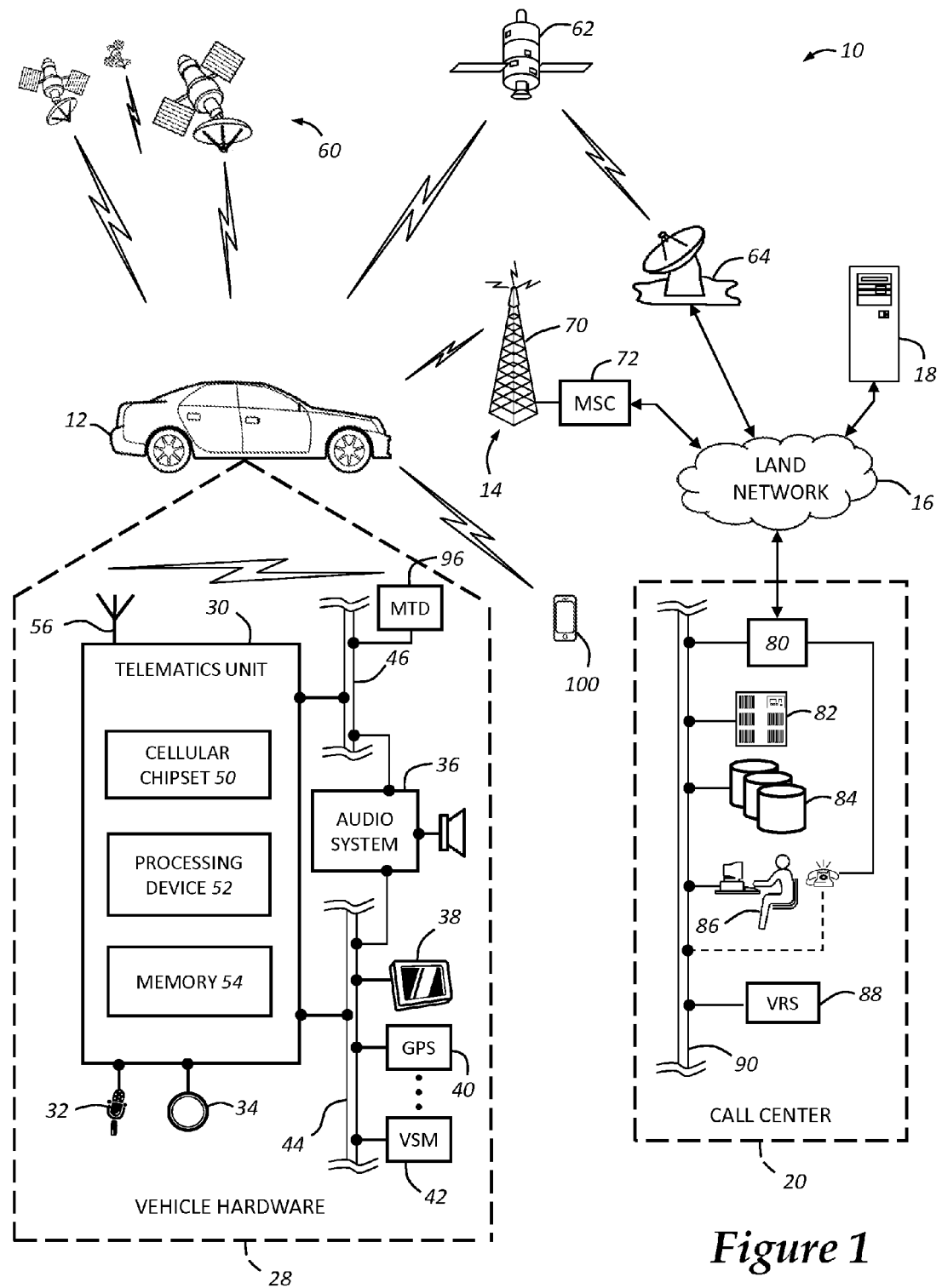
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS (global positioning system) module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 100) can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

In one implementation, the telematics unit 30 may be configured to be a wireless hotspot; i.e., the telematics unit 30 may provide a wireless local area network (WLAN) allowing communication devices with access or permission connectivity to the internet, the call center 20, or remote servers or computers 18. The hardware and software configurations needed to enable the telematics unit 30 with hotspot capability are known to skilled artisans.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, web pages, movies, television programs, videogames and/or other information is downloaded by an infotainment module (not shown) and may be stored for current or later playback or may be available for streaming from the call center 20 or a remote computer server 18 (with or without the infotainment module). The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 may also include a communication device such as a multi-tainment device (MTD) or a human machine interface (HMI) device 96 which may include some of the vehicle electronics previously discussed (e.g., the audio system 36, the visual display 38, etc.). As used herein, the multi-tainment device 96 may include all suitable electronics, software, etc. for providing vehicle entertainment and vehicle infotainment services to the vehicle users and/or occupants. In some instances, the multi-tainment device 96 is electronically coupled to (and in communication with) the telematics unit 30 (e.g., via bus 46). The device 96 may be modular or may be embedded within the vehicle 12. In addition, the multi-tainment device 96 may be integrated (e.g., a fixture) within the vehicle or in some circumstances may be detachably fixed or detachably tethered. Where the device 96 is detachable, the device may be operable both inside and outside of the vehicle. Furthermore, the device 96 may have an antenna coupled to a SRWC module therein (e.g., a Bluetooth or Wi-Fi Direct module). Examples of multi-tainment devices include interactive displays in the vehicle dashboard, interactive displays embedded within the backing of vehicle seating or the vehicle headliner, and other interactive vehicle devices/displays that are portable.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

In at least one implementation, the computer 18 may include a cloud server which may be capable of storing, accessing, and/or sharing electronic data stored therein. Electronic data may include a variety of data files or computers program instructions, for example, among other things, data files, data programs, software, and/or executable applications. The data files may be related to information, entertainment, or any other suitable data. In some instances, the applications may be operative from the server rather than being required to be installed on an individual computer or within the vehicle 12—e.g., within the telematics unit 30 or within the multi-tainment device 96. Skilled artisans will appreciate the multiplicity of ways to utilize server computing (e.g., but not limited to: database servers, file servers, mail servers, print servers, web servers, gaming servers, etc.).

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include communication devices other than the multi-tainment device 96, such as one or more mobile devices 100. In some instances, the mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications, short-range wireless communication (e.g., Wi-Fi Direct and Bluetooth), and communication by wire or tether, as well as other mobile device applications. Such mobile device applications may include software applications, which may be preinstalled or installed by the user (or manufacturer) (e.g., using a graphical user interface or GUI). The hardware of the mobile device 100 may comprise: a display, a keypad (e.g., push button and/or touch screen), a microphone, one or more speakers, motion-detection sensors (such as accelerometers, gyroscopes, etc.), and a camera. In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 100 include a cellular telephone, a personal digital assistant (PDA), a Smart Phone, a personal laptop computer having two-way communication capabilities, a netbook computer, a tablet computer, or combinations thereof. The mobile device 100 may be used inside or outside of a mobile vehicle (such as the vehicle 12 shown in FIG. 1), and may be configured to provide services according to a subscription agreement with a third-party facility or wireless/telephone service provider. In other instances, the mobile device 100 may or may not have cellular capability and may be capable of SRWC. And in still other instances, the mobile device 100 may have two-way communication capability by wire. It should be appreciated that various service providers may utilize the wireless carrier system and that the service provider of the telematics unit 30 may not necessarily be the same as the service provider of the mobile device 100 (where applicable).

The mobile device 100 and the vehicle 12 may be used together by a person known as the vehicle user such as the driver. However, the vehicle user does not need to be the driver of the vehicle 12 nor does the vehicle user need to have ownership of the mobile device 100 or the vehicle 12 (e.g., the vehicle user may be an owner or a licensee of either or both).

Method—

The above-described operating environment may be used to carry out the various methods described below. The illustrated methods are merely exemplary.

The methods described herein pertain to data communications between a remotely located telematics backend system that includes the call center 20, the remote server or computer 18, or both. The data communications may comprise cellular transmissions or communications, or cellular communication combined with other local vehicle communications such as short range wireless communication (SRWC) or even intra-vehicle, wired communications (e.g., using discrete connections or bus 44, 46 communications). The data communications may be to or from the call center 20. Within the vehicle 12, the data communications may be to or from: the telematics unit 30, the MTD 96, or one or more mobile devices 100.

Each of the vehicle communication devices, i.e., the telematics unit 30, the MTD 96, or the mobile device(s) 100, may be associated with a different or distinct access point name (APN). The APN may be identifiable using a unique identifier. The unique identifier may be any number, letter, special character, or combination thereof (such as an alphanumeric sequence) and may include the device's name and various technical information that would uniquely identify the device. In one implementation, the unique identifier is a media access control address (or MAC Address) of the communication device. Thus, as will be explained in greater detail below, during data communications between the telematics backend system and one of the vehicle communication devices, the manner or the way in which vehicle data services are transmitted or received may differ with each APN. For example, when the APN indicates that the communication device is the telematics unit, the data rates, transmission latencies, data costs, etc. may have a first set of wireless communication parameters. And for example, when the APN indicates that the communication device is the MTD 96, the data rates, transmission latencies, data costs, etc. may have a second set of wireless communication parameters. And likewise, when the APN indicates that the communication device is one of the mobile devices 100, the data rates, transmission latencies, data costs, etc. may have a third set of wireless communication parameters.

The sets of wireless communication parameters may be configured or applied in order shape network traffic according to a scheme that optimizes or maximizes wireless network efficiency and/or provides data according to predefined customer plans and expectations. For example, using one or more sets of wireless communication parameters during data communication between the backend system and the vehicle, the backend system may manage data communication with the vehicle (and its communication devices). Likewise, using these one or more sets of wireless communication parameters, the backend system may manage data communications between it and multiple vehicles (like the vehicle 12). Collectively or individually, by managing the transmission of data communications to and from the vehicle(s), the management of network traffic may be more efficient and/or optimized.

In at least one embodiment, a nature or type of the vehicle data services (e.g., transmitted or received) may be another factor in determining a set of wireless communication parameters. For example, vehicle services data may include usage characteristics, transmission characteristics, and/or billing characteristics. Thus, any network traffic shaping scheme may at least partially depend upon one or more sets of wireless communication parameters associated with one or more of these characteristics.

Usage characteristics may include: total data transmission quantity per month, data transmission frequency per month, and/or data transmission quantity per vehicle download or upload, just to name a few examples.

Transmission characteristics may include: peak data transmission rates, variations in peak data transmissions, sensitivity to a type of wireless network, sensitivity to quality of wireless network coverage, sensitivity to quantity of wireless network coverage, sensitivity to transmission latency, data transmission priority, data transmission security, data transmission reliability, and/or data transmission efficiency, just to name a few examples.

And billing characteristics may include: sensitivity to cost per data unit and sensitivity to total data transmission quantity per month, just to name a couple examples.

FIGS. 2, 3 and 4 illustrate a variety of examples of usage characteristics, transmission characteristics, and billing characteristics. More specifically, the usage, transmission, and billing characteristics are illustrated with respect to embodiments of vehicle services data types; namely, vehicle-backend private data, vehicle Wi-Fi hotspot data, and head-unit (or MTD) application data. Vehicle-backend private data pertains to any data communicated from the vehicle to the backend system (e.g., 18 or 20) or vice-versa. At the vehicle, the communication device may be the telematics unit 30, the MTD 96, or the mobile device 100. In one implementation, the vehicle-backend private data is transmitted between the telematics unit 30 and the backend system, and is automated (e.g., without user interaction). The vehicle Wi-Fi hotspot data may be any data communications provided using Wi-Fi in the vehicle; e.g., the telematics unit 30 may provide SRWC or, according to one embodiment, the telematics unit 30 may be a gateway enabling SRWC communication via the MTD 96. Thus, for example, one of the mobile devices 100 in the vehicle may be the recipient of the vehicle services data provided by the telematics backend system. And the head-unit application data may be any data specifically provided to the vehicle's MTD 96; in one particular embodiment, the head-unit application data may be radio application data (e.g., providing internet radio or internet broadcasting services to the vehicle users).

For example, in FIG. 2 (illustrating an embodiment of vehicle-backend private data), various usage, transmission, and billing characteristics are illustrated. Here, different types of vehicle-backend private data are illustrated (safety-related data, GPS augmentation data, diagnostic data, and traffic probe data), including their respective usage, transmission, and billing characteristics.

For example, with regard to the safety-related data, the usage characteristics include low data usage (e.g., a few kilobytes (kb) per month per user or customer). The transmission characteristics include: low peak data rate, a relatively low sensitivity to network latencies or delays, a relatively high sensitivity to the wireless infrastructure's footprint (e.g., a wireless landmass coverage footprint is of high importance), a desirability for priority when the wireless network is busy or heavily trafficked, and a relatively high sensitivity to network security (i.e., the need for communication security is relatively). And with regard to billing characteristics, the safety-related data is generally insensitive to cost per Megabyte (Mb), because average monthly data usage is relatively small.

In another example, with regard to the GPS augmentation data, the usage characteristics include high data usage (e.g., even though the data rate may be lower, usage is higher since GPS data is typically a constant stream). The transmission characteristics of the GPS augmentation data include: low peak data rate, a relatively low sensitivity to network latencies or delays, a relatively high sensitivity to the wireless infrastructure's footprint (e.g., the wireless landmass coverage footprint is of high importance), a desirability for priority when the wireless network is busy or heavily trafficked, and a relatively high sensitivity to network security (i.e., the need for communication security is relatively). And with regard to billing characteristics, the safety-related data is sensitive to cost per Megabyte (Mb), e.g., as the data is constantly streaming.

In another example, with regard to the vehicle diagnostics data, the usage characteristics include infrequent data uploads (e.g., which may be performed once per month). The transmission characteristics of the GPS augmentation data include: an extremely low sensitivity to network latencies or delays (e.g., data uploads may be performed in nonpeak periods (e.g., at night) when the wireless network is generally idle), a low sensitivity to the wireless infrastructure's footprint (e.g., the wireless coverage footprint is of lesser importance), a relatively low desirability for priority when the wireless network is busy or heavily trafficked, and a lesser sensitivity to network reliability (e.g., in the event a vehicle data upload fails one night, the telematics unit 30 simply may attempt to upload the next night). And with regard to billing characteristics, the diagnostics data is sensitive to cost per Megabyte (Mb) (e.g., in the aggregate, monthly data usage may be significant).

In another example, with regard to the traffic probe data, the usage characteristics include low usage (e.g., very small packets of data sent periodically—e.g., every five seconds). The transmission characteristics of the traffic probe data include: an insensitivity to network reliabilities (e.g., minimal impact even when some transmissions are lost), a low sensitivity to network latencies, a low sensitivity to the wireless infrastructure's footprint (e.g., the wireless coverage footprint is of lesser importance), and a sensitivity to packet data transmission efficiency (e.g., since traffic probe data packets may be very small (e.g., on the order of 0.5 kb per packet), efficient packet transmission requires consideration that packet data overhead be minimized (since traditional packet data overhead is on the order of approximately 1 Mb per packet)). Therefore, without either reducing the size of the overhead or sending multiple traffic probe data packets with a single overhead, efficiency is not achieved. (And with regard to billing characteristics, the diagnostics data is generally insensitive to cost (e.g., at least when packet transmission is more efficient).

Turning now to FIG. 3, an embodiment of the usage, transmission, and billing characteristics of vehicle Wi-Fi hotspot data is shown. Here the type of vehicle data services may be for the MTD 96 or a mobile device 100. For example, where the telematics unit 30 is the Wi-Fi hotspot, either device 96, 100 may be connected as a client device. Or for example, where the telematics unit 30 provides connectivity to the MTD 96, the MTD may be the hotspot while the mobile device 100 is the client device. In at least one embodiment, the Wi-Fi hotspot data is provided to one or more mobile devices 100 and includes audio data, image data (picture, video, etc.), or both. FIG. 3 illustrates that the usage characteristics may be a relatively high usage for each device (e.g., on the order of Gb per month). The transmission characteristics may include: high peak data rates, high sensitivity to latency (e.g., application software executing on a mobile device requiring Wi-Fi connectivity may require minimal delay and/or high responsiveness), an ability to operate with variable or varying data rates during peak periods while generally operating at a higher data rate, and a sensitivity to the quality and quantity of wireless network coverage (e.g., operation on highly responsive LTE networks is desirable). And with regard to billing characteristics, the Wi-Fi hotspot data may be sensitive to cost (e.g., providing such data to the customer may not be suitable unless costs can be regulated to be competitive).

Turning now to FIG. 4, an embodiment of the usage, transmission, and billing characteristics of the head-unit application data is shown. Here, the type of vehicle services data may be associated with the MTD 96. The usage characteristics may be a relatively high usage for the MTD 96 (e.g., could be a number of Gb per month). The transmission characteristics may include: high peak data rates, a moderately high sensitivity to latency, an ability to operate with variable or varying data rates during peak periods while generally operating at a higher data rate, and a general sensitivity to network security. And with regard to billing characteristics, the head-unit application data may be sensitive to cost (e.g., providing such data to the customer may not be suitable unless costs can be regulated to be competitive).

Thus, the call center 20, the remote server 18, or both may control a number of factors in providing data to the vehicle (or receiving it therefrom). For example, it will be appreciated that supplying high speed data to all customers for all types of data or regardless of APN may not be efficient, as not all data requires high speed delivery (as discussed in the examples above). Similarly, providing vehicle users with only one data rate or with only one latency option/range or only one security level, etc. may over-inflate costs to the user(s) or alternatively lead to customer dissatisfaction based on undesirably slow data rates. However, by determining an APN for an associated communication device (such as the telematics unit, the MTD, or the mobile device) or by determining a type of vehicle services data to be communicated (or both), the wireless network may be utilized efficiently, ultimately improving the user experience (particularly when considering a large number of vehicles/users). For example, when data that does not need high speed transmission can be postponed or be sent at a lower rate, higher data rate exchanges may be fulfilled (or at least provided first)—e.g., as these channels are freed from network traffic that might be better delivered at slower rates or at a later time.

By way of example, a method 500 of providing vehicle data services between the vehicle and the telematics backend system is described (and illustrated in FIG. 5). In this example, the vehicle 12 communicates with the backend system during peak usage hours while the following vehicle data services are provided: vehicle-backend private data (e.g., diagnostics data and traffic probe data), vehicle Wi-Fi hotspot data (e.g., gaming data on a mobile device 100), and vehicle head-unit application data (e.g., internet radio).

Firstly, data communication is established (step 510) between the telematics backend system and the telematics unit 30, the MTD 96, and/or the mobile device 100. In one implementation, the establishment of data communication occurs between the backend system 18, 20 and three communication devices in the vehicle (30, 96, 100). In other examples, one or more of the devices 30, 96, 100 establish communication; and in still other implementations, there may be multiple mobile devices 100. In at least one implementation, the telematics unit 30 first establishes communication with the backend system; thereafter, the MTD 96 and/or devices 100 establish communication. In at least one embodiment, the telematics unit 30 behaves as an intermediary or proxy device; e.g., passing along communications to and from the MTD 96 and mobile device 100 to the backend system (e.g., on behalf of the MTD 96, mobile device 100).

Next (in step 520), the telematics backend system determines an APN for each of the communication devices 30, 96, 100. The backend system may query the telematics unit and/or the MTD and mobile device(s). In another implementation, the telematics unit 30 may provide to the backend system its APN and the APNs of the MTD 96 and mobile device 100. In one example, the name of the APN associated with the telematics unit 30 for private data may be "OnStar," the name of the APN for the MTD 96 may be "headunit," and the name of the APN for the mobile device 100 may be "othermobile-device." This step further may include providing a MAC address from each device 30, 96, 100 to the backend system. In at least one embodiment, step 520 may be part of or a sub-step to step 510.

Next (in step 530), having identified the terminal devices (at the vehicle 12), the telematics backend system determines the type of data being requested from each of these devices 30, 96, 100. This may occur via a direct communication from the backend system to the respective device 30, 96, 100; or in some instances, the telematics unit 30 provides this information to the backend system (e.g., serving as the intermediary). For example, the backend system may determine that: the type of data being requested by the telematics unit 30 is diagnostics data and traffic probe data (see FIG. 2); the type of data being requested by the MTD 96 is internet radio; and the type of data being requested by the mobile device 100 is gaming data.

Next (in step 540), the telematics backend system holistically determines or weighs the types of data being requested considering the wireless communication parameters of each device with respect to the type of data (e.g., the usage characteristics, transmission characteristics, and/or billing characteristics). Weighing includes any suitable assessment of the nature or relative importance of a characteristic, with respect to or in view of determining a traffic shaping scheme. In other embodiments, this determination may occur at the telematics unit 30, which then conveys this information to the backend system 18, 20. Further, it should be appreciated that network traffic shaping may be affected by other considerations; e.g., not just the single vehicle 12, but a large quantity of other like vehicles that interact with the same backend system. It will be appreciated that greater network efficiency may be accomplished by managing network traffic of a large quantity of vehicles each having telematics units and each sending/receiving data to the backend system.

In the instant example, the diagnostic data may be delayed or even abandoned. For example, in light of the MTD data and mobile device data (which are more sensitive to latency), the diagnostic data may be considered low priority; e.g., delivery may be delayed until off-peak period (e.g., overnight). The traffic probe data, being less sensitive to latency, also may be delayed—while the internet radio data and gaming data may be passed through. Thus, for example, two traffic channels may be given relatively large bandwidths as internet radio and gaming data are streamed to the vehicle (and to the respective device 96, 100). A third channel may be intermittently active for the traffic probe data—e.g., during periods when the radio and gaming data are sufficiently buffered.

Next (in step 550), vehicle services data is communicated to the devices according to the determination—e.g., according to the determined traffic shaping or channel configurations. It should be appreciated that the traffic shaping is dynamic or changeable based on new criteria.

For example, at any time during the method 500, the method may repeat one or more of the previous steps—e.g., upon receipt of new criteria. FIG. 5 illustrates a few of these instances; however, this is not meant to be limiting but rather merely to provide examples. For example, the method 500 may proceed from step 550 to step 540 if the mobile device 100 temporarily stops or pauses its request or need for gaming data. Here, the telematics backend, observing the change in streaming data, dynamically may reassess or redetermine the traffic shaping configuration. Making this holistic determination may include enlarging the bandwidth of the internet radio stream to the MTD 96, removing any network traffic shaping latencies associated with the traffic probe data, providing all or some of the diagnostics data to the telematics unit (which was previously delayed) or determining to execute any combination thereof. Of course, after the redetermination is made, step 550 may follow providing such vehicle services based on the redetermination.

Or for example, step 550 may loop back to step 530; this may occur when the telematics unit requests a different type of data. For example, if the telematics unit 30 sends a request for GPS augment data, this desirably has higher priority than the previously-discussed traffic probe data or the diagnostic data. In turn (and all other things remaining equal), the bandwidth of the third traffic channel may be enlarged while the bandwidth of the first and/or second traffic channels are compensatorily decreased. This may occur coincident to changes in data requests from other devices as well. For example, the mobile device 100 may cease requesting gaming data and then request email data. While FIG. 3 illustrates hotspot data generally (e.g., to the mobile device), the backend system still may observe this change—thus, in at least one embodiment, not all hotspot data (FIG. 3) may be considered as having equal weight when making traffic shaping determinations. Similarly, when the backend system determines a dynamic shaping scheme, not all data requested by the MTD 96 (e.g., the Vehicle Wi-Fi Hotspot Data of FIG. 3 or the Head-Unit Application Data of FIG. 4) may be weighed equally.

Or for example, step 550 may loop back to step 520; this may occur when one or more new devices join—e.g., a second or third mobile device 100. Or this may occur when one of the previously connected devices (30, 96, 100) disconnects.

In each of these examples, the method may proceed to the subsequent shown step(s). For example, if the method loops back to step 520, it may proceed to 530, 540, 550 (and etc.). Following step 550, the method 500 may end. Method 500 illustrates only the single vehicle 12 and traffic shaping techniques according to one embodiment. Based on the description above, other applications of similarly suited techniques will be apparent to skilled artisans. And moreover, when similar dynamic traffic shaping techniques are applied to multiple vehicles (e.g., and multiple subscribing users), a substantial improvement in network efficiency may be realized, as well as an improvement or maintenance of customer satisfaction.

The following description illustrates another example using a portion of the communication data transmitted between the backend system and the vehicle 12.

Figure 6:
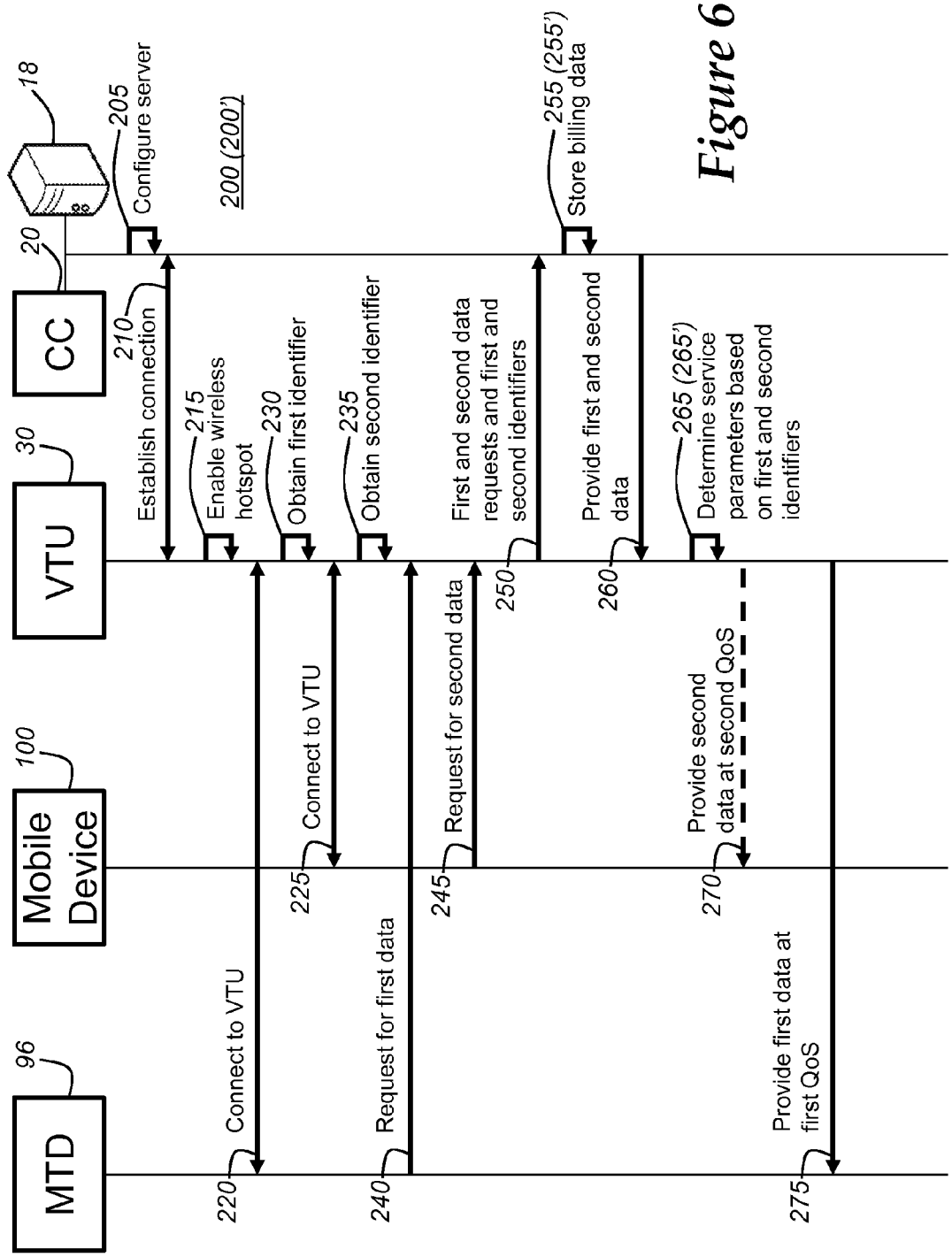
FIG. 6 is a flow diagram illustrating two exemplary methods utilizing the communications system shown in FIG. 1.

According to this embodiment (method 200 shown in FIG. 6), one or more service parameters may be configured at the call center 20 or cloud server 18 for use with one or more communication devices in the vehicle 12 (step 205). Service parameters (e.g., sets of wireless communication parameters) include quality of service (QoS) parameters, billing parameters, etc. (e.g., defined according to transmission characteristics, billing characteristics, etc.). As will be appreciated by skilled artisans, QoS parameters include connection requirements such as service response time, loss, signal-to-noise (SNR) ratio, cross-talk, echo, interrupts, frequency response, loudness levels, etc. QoS may also include grade of service (GoS) requirements, as understood by skilled artisans. QoS may be used to provide different priority to different communication devices located at the vehicle 12 or to provide a predetermined level of performance to a data flow. Performance characteristics may include bit rate, delay, jitter, packet dropping probability, and/or bit error rate. In some applications, assurance of a predetermined level of performance is desirable, especially for real-time streaming multimedia applications such as voice over internet protocol (VoIP), online gaming, streaming radio and/or video, etc. as these examples often require fixed bit rate and are delay sensitive, especially when communicated over the wireless carrier system 14, where through-put or bandwidth may be limited.

The billing parameters may include any parameter associated with charges for providing data to the various communication devices located at the vehicle 12. These parameters may include customer information, communication device identifiers and other suitable communication device information, and different billing rates and data usage for the various communication devices. It may also include predetermined monthly caps for a particular device; e.g., a data usage limit which, when reached, terminates service to a particular communication device. These billing parameters are merely exemplary; other such parameters will be apparent to skilled artisans.

Once the service parameters are configured (step 205), the telematics unit 30 may establish a wireless connection with the call center 20 and/or server 18 (step 210); e.g., a cellular connection.

In addition, the telematics unit 30 may enable its hotspot or WLAN capability (step 215) to connect to one or more communication devices. In this example, one mobile device 100 and the multi-tainment device (MTD) 96 connects to the telematics unit 30 via the hotspot (steps 220, 225). Although it should be appreciated that the devices 96, 100 may couple to the telematics unit in other ways, e.g., via SRWC, by wire, etc.

At the time of connection, the telematics unit 30 may acquire a unique device identifier from each of the communication devices (steps 230, 235). Acquiring this identifier may also occur later as well, e.g., when the communication device requests a vehicle service or prior to the vehicle service being ultimately provided to the communication device by the telematics unit.

Following connection to the WLAN, the communication devices may request vehicle services data (steps 240, 245), e.g., first vehicle services data and second vehicle services data, respectively. For example, the MTD 96 may request streaming music (e.g., via a Pandora™), and the mobile device 100 may request to engage in an online game (e.g., Clash of Clans™). In some embodiments, steps 220 and 240 may occur at or near the same time. Similarly, in some embodiments, steps 225 and 245 may occur at or near the same time.

The requests may be received first by the telematics unit 30, and the telematics unit may communicate those vehicle service requests and the identifiers of the devices 96, 100 to the call center 20 (step 250). This may occur as a single wireless transmission or may occur as separate wireless transmissions.

The requests may be received and processed by the call center 20 (step 255). The processing step may include associating or correlating the identifier of each device 96, 100 to one or more billing parameters (e.g., a billing rate). For example, the call center may determine that the MTD identifier should be correlated to a first (e.g., a preferred) billing rate, and the mobile device identifier should be correlated to another billing rate. The processing of step 255 may further include associating various QoS parameters with each communication device 96, 100. For example, the streaming music request by the multi-tainment device 96 may be granted higher priority and a higher level of performance than the online gaming request by the mobile device 100—this also may be based on the identifier. In some implementations, the identifiers may be used in combination with other situational or circumstantial criteria to determine what billing and QoS parameters are appropriate.

The processing step 255 may further include determining an appropriate data channel to communicate the requested vehicle services data to the telematics unit 30. As will be apparent to those skilled in the art, wireless networks (e.g., GSM, CDMA, etc.) may operate using multiple data channels or tunnels. For example, in GSM networks, TDMA uses eight time slots which may be further segregated into logical channels—e.g., signaling channels (BCH, CCH, SDCCH, ACCH, etc.) and traffic channels (TCH). These logical channels may be used for different categories or types of data to be transmitted on assigned or predetermined frames in an assigned or predetermined time slot. Thus, in at least one implementation, the call center 20 may associate the identifier of the MTD 96 with a first TCH and the identifier of the mobile device 100 with a second TCH.

In another example, the appropriate data channel may be associated with a packet data network (or PDN). Skilled artisans will appreciate that wireless service providers utilize multiple PDNs. Thus, the processing step 255 may include determining (e.g., at the call center 20) which data channels of the PDN to use in providing the vehicle services data to the communication devices 96, 100. For example, vehicle services data provided to the MTD 96 may be sent via PDN1, and vehicle services data provided to the mobile device 100 may be sent via PDN2.

And in at least one implementation, the call center 20 may determine the most suitable data channels for transmission based on a predetermined prioritization algorithm. The algorithm may accept as input a number of factors, including the unique device identifier from each of the communication devices, the requested vehicle services data, the particular telematics unit 30 in the vehicle 12 (model number, chipset, etc.) and its capability, the current cellular network conditions, including volume of traffic, etc., just to name a few considerations. The algorithm may perform calculation(s) to determine a suitable output—e.g., which vehicle services data should be sent over which data channel, to the particular vehicle 12. It will be appreciated that this algorithm may support multiple vehicles sequentially, concurrently, or both sequentially and concurrently.

Thus in step 260, according the exemplary requests above, the streaming music may be sent over the first TCH while the online gaming data may be sent over the second TCH. In at least one implementation, any vehicle data services sent from the call center 20 or cloud server 18 that is ultimately to be provided to the MTD 96 is transmitted over a dedicated data channel—e.g., PDN1 may be the dedicated data channel.

At step 265, the telematics unit 30 may receive the data over the first and second TCH and determine which data is to be delivered to the MTD 96 and which data is to be delivered to the mobile device 100. This may be determined, at least in part, on an association using the two unique identifiers.

And at steps 270, 275, the data is provided to each communication device 96, 100 via the hotspot; i.e., the streaming music is provided to the MTD and the mobile device receives connectivity for online gaming.

Of course, additional steps to method 200 also are possible. For example, method 200 may include presenting a bill or request for payment to the vehicle user based on data usage associated with the first PDN, and presenting a bill or request for payment to the mobile device user based on data usage associated with the second PDN. In some instances, the bill may reflect that vehicle services data was provided at a higher priority or higher QoS.

According to a second embodiment (also shown in FIG. 2), a method 200' has like numbers designating like steps or parts associated with method 200. However, in method 200', step 255 is replaced by step 255' and step 265 is replaced by step 265'.

At step 255', the call center 20 receives the request(s) sent at step 250 and performs processing associated with the billing parameters. The call center still provides the data over different data channels still at 260. However, upon receipt of the data at step 265', the telematics unit 30 determines the QoS parameters (including priority) and then accordingly provides the data to the communication devices 100, 96 at steps 270, 275, respectively. For example, the telematics unit 30 may associate any Wi-Fi hotspot data not provided to the MTD 96 as having a lower priority (or providing lesser QoS). In some instances, this determination may be transmitted from the telematics unit 30 to the call center 20, which then provides the vehicle services data according to the priority requested by the telematics unit. In other circumstances, the call center 20 may provide unprioritized vehicle services data to the telematics unit (or without regard to QoS) and the telematics unit 30 may determine which priority to provide the various communication devices (e.g., 96, 100, etc.).

Other embodiments are also possible. For example, the telematics unit 30 may be configured to store some of the billing parameters associated with various communication devices used in the vehicle. Periodically, this information may be uploaded to the call center 20 or server 18 (e.g., coincident to a billing cycle). Or for example, the telematics unit 30 may determine appropriate billing and/or QoS parameters according to the unique identifier associated with the communication device. Then, the telematics unit may request the vehicle services to be sent over specific data channels from the call center 20 or server 18. In addition, under certain circumstances, the telematics unit 30 may base the QoS parameters on additional situational criteria at the vehicle (e.g., emergency or other predetermined vehicle state).

The method(s) may be performed as one or more computer programs executable by one or more computing devices of or in communication with a vehicle telematics system to cause the system and/or the computing device(s) to perform the method, and the various method related data may be stored in any suitable memory. For example, the computer program(s) may be located at the telematics unit 30 or at the call center 20 or even at the cloud computer 18. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

In one embodiment, the performed method(s) include computer programs executable using the mobile device processor and memory (including mobile device software stored thereon), the telematics unit processor and memory (including telematics unit software stored thereon), and/or the call center processor and memory (including backend software stored thereon).

In at least one embodiment, the computer program is configured to determine or select appropriate data channels for cellular transmission of the data services provided to the MTD 96 and mobile device 100. Thus, the computer program may reside at the call center 20—which call center also performs the cellular transmission. Or the computer program may reside at the telematics unit 30—which telematics unit then instructs the call center 20 to send the data services over the data channels which it determined. These are merely examples; other implementations are possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing vehicle data services to communication devices located at a remote vehicle, comprising the steps of:
    establishing data communication between a telematics backend system and one of a plurality of communication devices located at the remote vehicle;
    determining at the telematics backend system: an access point name (APN) for each of at least two of the plurality of communication devices and a type of vehicle services data for the at least two of the plurality of communication devices; and
    based on the determined APNs and the determined type of vehicle services data, transmitting from the telematics backend system the vehicle services data according to a network traffic shaping scheme, wherein the network traffic shaping scheme is determined at the telematics backend system and associated with regulating performance of data transmission between the telematics backend system and the remote vehicle,
    wherein the vehicle services data includes data associated with regulating performance of data transmission between the telematics backend system and the remote vehicle.

2. The method of claim 1, wherein the data communication between the telematics backend system and one of the plurality of communication devices includes cellular communication, or cellular communication and at least one of: short range wireless communication and wired vehicle communication.

3. The method of claim 1, wherein the plurality of communication devices include a vehicle telematics unit, a vehicle multi-tainment device (MTD), or a mobile device located at the vehicle, wherein each of the plurality of communication devices is associated with a different APN.

4. The method of claim 3, wherein the type of vehicle services data is one of vehicle-backend private data, vehicle Wi-Fi hotspot data, or head-unit application data associated with the MTD.

5. The method of claim 4, wherein the vehicle-backend private data includes safety-related data, global positioning system (GPS) augmentation data, vehicle diagnostic data, or traffic probe data.

6. The method of claim 4, wherein the vehicle Wi-Fi hotspot data includes audio data, image data, or both.

7. The method of claim 4, wherein the head-unit application data associated with the MTD includes audio data, image data, or both.

8. The method of claim 1, wherein the telematics backend system includes a call center, a remote server associated with the call center, or both.

9. The method of claim 1, wherein the type of vehicle services data includes usage characteristics, transmission characteristics, and billing characteristics, wherein the traffic shaping scheme at least partially depends upon parameters associated with one or more of the usage characteristics, the transmission characteristics, or the billing characteristics.

10. The method of claim 9, wherein the parameters of the usage characteristics include one or more of total data transmission quantity per month, data transmission frequency per month, and data transmission quantity per vehicle download or upload.

11. The method of claim 9, wherein the parameters of the transmission characteristics include one or more of peak data transmission rates, variations in peak data transmission times, sensitivity to a type of wireless network, sensitivity to quality of wireless network coverage, sensitivity to quantity of wireless network coverage, sensitivity to transmission latency, data transmission priority, data transmission security, data transmission reliability, and data transmission efficiency.

12. The method of claim 9, wherein the parameters of the billing characteristics include one or more of sensitivity to cost per data unit and sensitivity to total data transmission quantity per month.

13. The method of claim 1, wherein the network traffic shaping scheme further is associated with regulating performance of data transmission between the telematics backend system and a plurality of other remote vehicles, the remote vehicle and each of the plurality of other remote vehicles comprising a telematics unit.

14. A method of providing vehicle data services to communication devices located at a remote vehicle, comprising the steps of:
 establishing data communication between a telematics backend system and two communication devices located at the remote vehicle;
 determining at the telematics backend system an access point name (APN) for each of the two communication devices;
 determining at the telematics backend a type of data being requested by the two communication devices, the types including: backend private data, hotspot data, and head-unit data;
 holistically determining at the telematics backend system a dynamic traffic shaping scheme at least partially based on the APNs and the data types; and
 providing vehicle data services to the two communication devices based on the holistic determination.

15. The method of claim 14, further comprising providing similar vehicle data services to multiple vehicles from the telematics backend system.

16. The method of claim 14, wherein the backend private data includes safety-related data, GPS augment data, vehicle diagnostic data, and traffic probe data.

17. The method of claim 14, wherein the holistically determining step further comprises weighing a set of wireless communication parameters associated with each of the two communication devices.

18. The method of claim 17, wherein each of the sets of wireless communication parameters include usage characteristics, transmission characteristics, billing characteristics, or any combination thereof.

19. The method of claim 14, wherein the dynamic traffic shaping scheme is associated with regulating performance of data transmission between the telematics backend system and the remote vehicle.

* * * * *